United States Patent [19]

Galles

[11] Patent Number: 5,655,102
[45] Date of Patent: Aug. 5, 1997

[54] SYSTEM AND METHOD FOR PIGGYBACKING OF READ RESPONSES ON A SHARED MEMORY MULTIPROCESSOR BUS

[75] Inventor: Michael B. Galles, Los Altos, Calif.

[73] Assignee: Silicon Graphics, Inc., Mountain View, Calif.

[21] Appl. No.: 128,081

[22] Filed: Sep. 29, 1993

[51] Int. Cl.⁶ .................................................. G06F 13/16
[52] U.S. Cl. ........................ 395/477; 395/478; 395/485; 395/495; 395/473
[58] Field of Search ..................................... 395/400, 425, 395/474, 477, 457, 475, 495, 496, 726, 856, 287, 289, 473, 485, 478; 364/200 MS File, 900 MS File

[56] References Cited

U.S. PATENT DOCUMENTS

| | | | |
|---|---|---|---|
| 4,187,538 | 2/1980 | Douglas et al. | 395/425 |
| 4,707,781 | 11/1987 | Sullivan et al. | 395/474 |
| 4,935,866 | 6/1990 | Sauvajol et al. | 395/325 |
| 5,191,649 | 3/1993 | Cadambi et al. | 395/200 |
| 5,228,136 | 7/1993 | Shimiza et al | 395/468 |
| 5,251,308 | 10/1993 | Frank et al. | 395/425 |
| 5,375,215 | 12/1994 | Hanawa et al. | 395/425 |

*Primary Examiner*—Eddie P. Chan
*Assistant Examiner*—Hiep T. Nguyen
*Attorney, Agent, or Firm*—Sterne, Kessler, Goldstein & Fox P.L.L.C.

[57] ABSTRACT

A system and method for piggybacking read responses on a shared memory, multiprocessor bus having a plurality of nodes coupled to the bus. The system determines whether a pending read request from a first node targets data required by a subsequent read request from a second node. The system then piggybacks a read response corresponding to the pending read request by permitting the first and second nodes to share the required data without transmitting the subsequent read request on the bus or otherwise generating any additional bus traffic. The system also supports piggybacking of multiple simultaneous read transactions to different addresses.

20 Claims, 4 Drawing Sheets

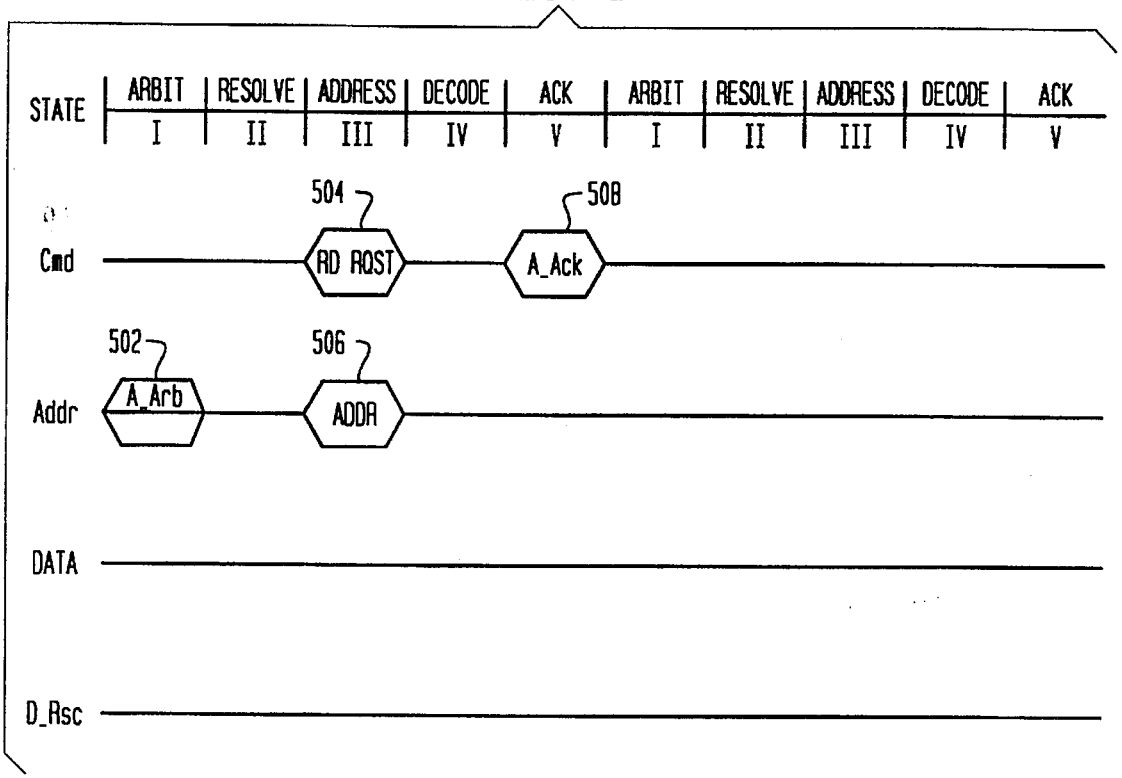
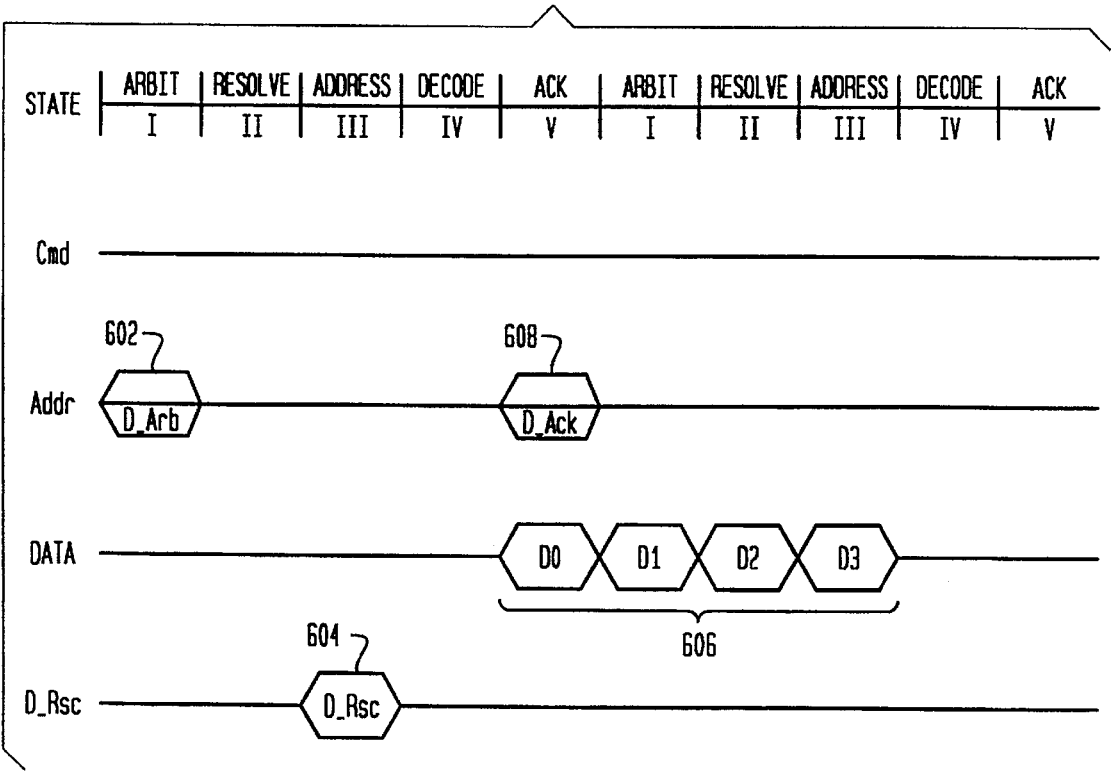

SYSTEM AND METHOD FOR PIGGYBACKING OF READ RESPONSES ON A SHARED MEMORY MULTIPROCESSOR BUS

BACKGROUND OF THE INVENTION

1. Field of the Invention

The present invention relates generally to the field of computers, and more particularly, to a system and method permitting nodes coupled to a memory multiprocessor bus to share "piggyback" read responses.

2. Related Art

Modern multiprocessing systems typically have a plurality of processors, a main memory and other input/output (I/O) devices that are coupled to a main system bus. To permit maximum utilization of the bus these systems use split transactions. (For simplification, the processors, main memory and I/O devices will be referred to as "nodes".) A split transaction is a read transaction that is split into a read request transaction that contains the address of the data requested, and a reply transaction that contains the requested data. Reply transactions are also called read responses. Each transaction must be tagged so that the requesting node and the replying node (e.g., main memory or a processor having the requested data in its cache) can keep track of the status of the read request. When individual transactions being performed by a node are long in duration, a split transaction approach allows several transactions to simultaneously occupy the bus, thus increasing the effective bandwidth of the bus.

In order to support split transactions on a shared bus, both the requesting node and the replying node must arbitrate for the bus to perform their respective functions. Thus a split transaction bus has higher bandwidth, but usually has higher latency than a bus that is held for the entire read transaction.

Several modern multiprocessing systems employ split transactions. A conventional bus system called FutureBus also describes a mechanism called "snarfing", which allows multiple nodes to participate in a read response transaction. What these systems lack is a technique for efficiently tracking split reads, maintaining cache coherency while split transactions are pending, and allowing multiple nodes to accept read responses without impacting bus bandwidth or latency. For example, while FutureBus describes the snarfing mechanism, it does not present a method for snarfing split transactions explicitly. Instead, FutureBus suggests that when multiple nodes attempt to initiate split transactions to the same cache line, all nodes but the first node issuing the request should be told to wait or retry later, which is an inefficient use of bus bandwidth. Also missing from FutureBus is a mechanism which tells nodes that a given read response for a split transaction targets the same address they are attempting to read, which must be known for snarfing to occur.

What is desired is a system and method for sharing read responses on a split transaction multiprocessor bus, while eliminating redundant read requests.

SUMMARY OF THE INVENTION

The present invention is directed to a system and method for implementing "piggyback reads" which eliminate redundant read requests allowing processors to share read requests and responses.

Piggyback reads reduce bus utilization and decrease read latency. Bus utilization is decreased because all participating processors can accept data from a single read request, which reduces the total number of read requests and responses placed on the bus. Latency is reduced because all processors need not wait for a serial stream of read requests and responses to complete before continuing.

According to the present invention it is possible to implement a split transaction policy based on read resources and piggyback reads in a system that adheres to the FutureBus protocol mechanisms, thus eliminating many of the FutureBus inefficiencies discussed above.

BRIEF DESCRIPTION OF THE FIGURES

The invention will be better understood if reference is made to the accompanying drawings in which:

FIG. 5 shows a bus timing diagram for an initial read request.

FIG. 6 shows a bus timing diagram of a read response that is piggybacked by one or more additional processor nodes.

In the drawings, like reference numbers indicate identical or functionally similar elements. Additionally, the left-most digit of the reference number identifies the drawing in which the reference number first appears.

DETAILED DESCRIPTION OF THE PREFERRED EMBODIMENTS

The following two text books provide further discussions of modern system buses and transactions between nodes on such buses: John L. Hennessy et al., "Computer Architecture—A Quantitative Approach", (Morgan Kaufmann Publishers, Inc., San Mateo, Calif., 1990); and Stephen B. Furber, "VLSI RISC Architecture and Organization", (Marcel Dekker, Inc., New York, N.Y., 1989), which are both incorporated herein by reference.

System Overview

Figure 1:
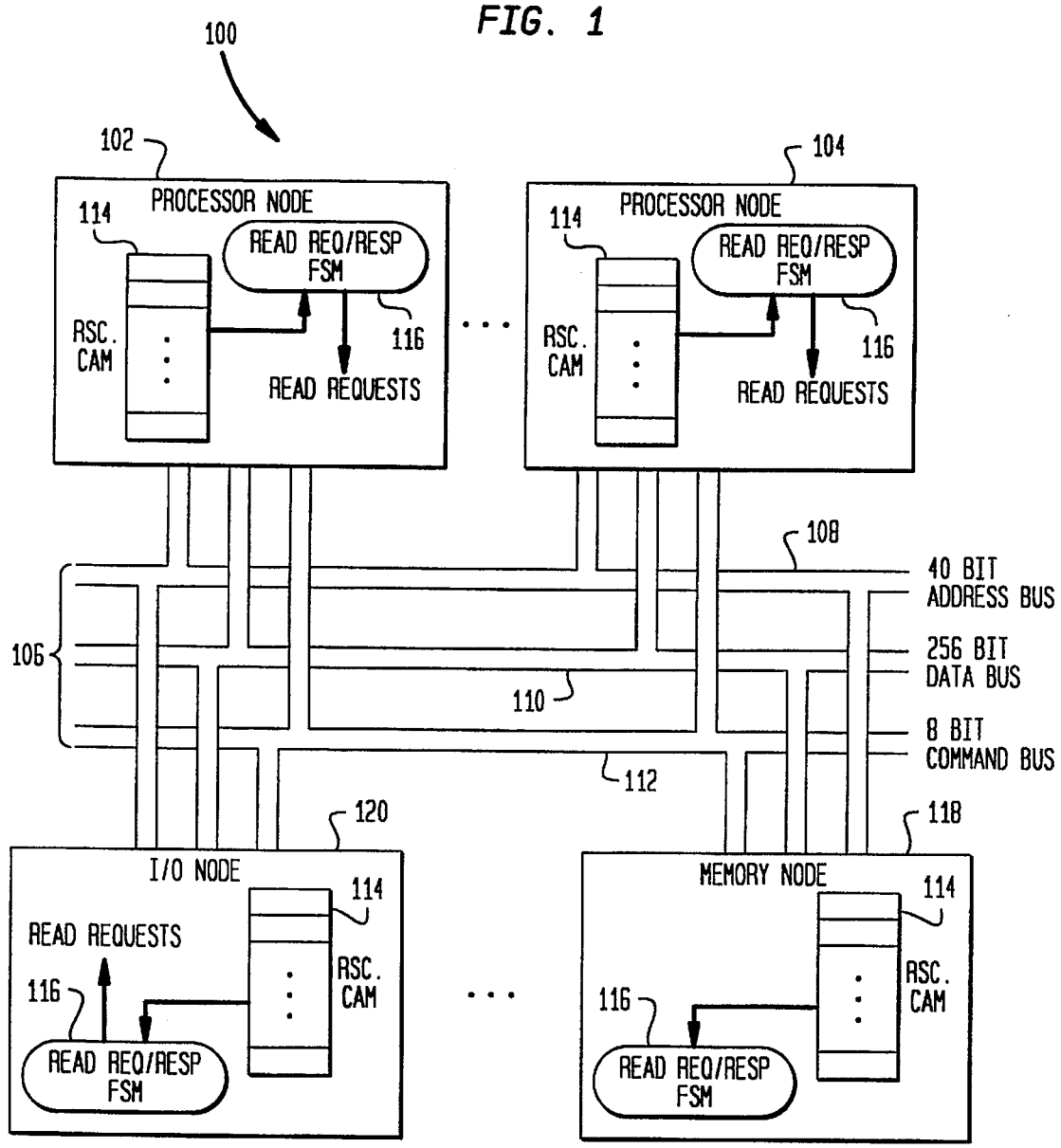
FIG. 1 shows a high level representative block diagram of multiprocessing system 100 according to the present invention.

FIG. 1 shows a high level representative block diagram of a multiprocessing system 100. A plurality of nodes, including processor nodes 102 and 104, a shared memory node 118, and an I/O node 120 are coupled to a main system bus 106. The main system bus 106 (also called the system bus) comprises at least a 40 bit address bus 108, a 256 bit data bus 110 and an 8 bit command bus 112. As would be apparent to a person skilled in the relevant art, the number and type of nodes coupled to the main system bus 106, as well as the configuration of bus 106 may vary greatly.

Reads on the system bus 106 are split into read requests and read responses. This allows other transactions, including other read requests, to occur between a read request and read response pair, because the memory or cache (both not shown) of another processor, for example, will require several cycles to provide the data.

After a read request is issued on the bus, the read is said to be pending. It will remain pending until the read response which satisfies the request is issued. While the read is pending, no coherent transactions which target the same data as the pending read may be issued. This restriction allows reads to behave as if they were not split transactions for coherency considerations.

To enforce this restriction, each node on the bus must keep track of pending coherent reads. Because this requires a fully associative comparison to occur at each node before it can issue a coherent transaction, the bus protocol limits the number of pending reads. In the preferred embodiment of the present invention, no more than eight reads may be pending at any given time.

There is no coherency restriction for pending, non-coherent reads, but non-coherent reads must follow the pending read limit as well. This provides flow control for non-coherent reads and simplifies the implementation of the read response control logic.

Read Resources

Read resources are implemented as Content Addressable Memories (CAMs). Read resource CAMs 114 are distributed throughout the system. An associated CAM controller including a finite state machine (FSM) reside in a processor node bus interface logic unit 116 in each processor node. Each processor node must have a consistent copy of the read resources in its CAM 114 to maintain cache coherency. Pending transactions are entered in the read resource CAMs 114 throughout the system so that split transactions can be tracked and protected. Read resources protect split transactions by preventing the broadcasting (e.g., transmission on the bus) of new transactions which target the same address as pending transactions. Read resources are also used to identify read responses, as well as indicating the termination of a transaction.

Each read resource CAM 114 includes a number of storage registers, elements, or the like, equal to the number of read resources desired, and each register is a predetermined number of bits wide. A preferred embodiment of CAM 114 and its operation are fully described in co-pending, commonly owned patent application U.S. Ser. No. 08/128,080, filed Sep. 29, 1993, titled "A System and Method of Implementing Read Resources in a Multiprocessor Environment". The following paragraphs in this section provide an overview of read resources to provide a foundation for the subsequent piggyback read description.

A valid bit in each CAM entry is used to indicate whether that address is activated and is currently being protected by a read resource. When a transaction is terminated, the corresponding valid bit of the read resource is deasserted, and the corresponding read resource is returned to the free pool.

When any node attempts to initiate a new transaction, the transaction address is first compared with each entry in the read resource CAM. If a "match" is found the transaction is not allowed to proceed until the matching entry becomes invalid. By blocking new transactions when a match with a pending transaction occurs, the read resource CAM 114 protects the pending transaction from conflicting bus traffic.

When a node successfully places a read request on the bus (i.e., no match is found in the local CAM), a read resource is allocated and an entry is made in a register of the read resource CAM of that node. When that node places the read request on the bus it is said to "broadcast" the transaction. Thus, every other node will observe this request. Each of the other nodes will deterministically assign the same read resource number to that read request, and it will store the address of the read request at the same register in its CAM and mark that entry valid. The read request is now considered pending, and occupies exactly one, and the same, numbered register in each read resource CAM 114. In this way it is guaranteed that the distributed system will all be in step (i.e., each CAM will have the same read resource information).

A major advantage in the above described distribution is that the read resource information implicitly flows to all nodes without any additional communication overhead. In a similar fashion, when read responses are transmitted on the bus, the appropriate read resource number is also transmitted. This tagging of read responses with read resource numbers is an efficient way to provide response data without rebroadcasting the read address, and thus conserving bus bandwidth.

System Bus Transaction Cycles

Figure 2:
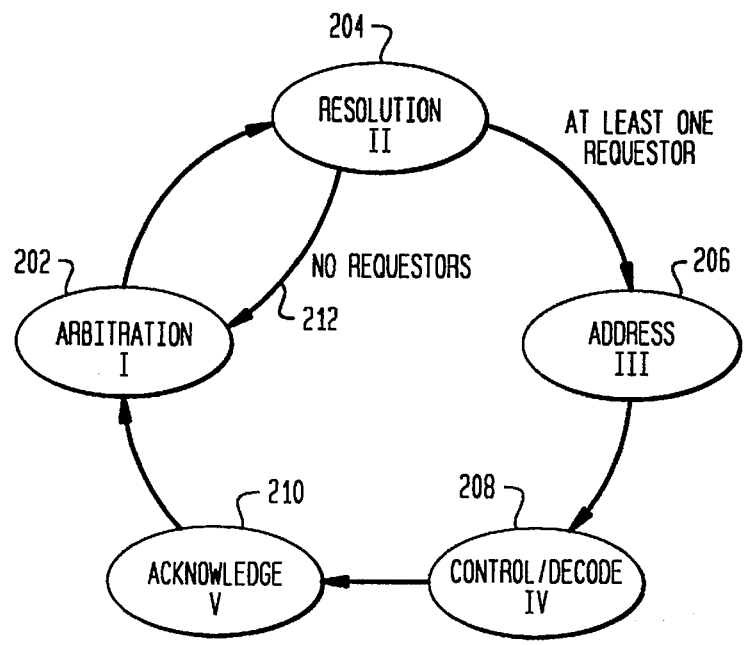
FIG. 2 is a state diagram of the system bus 108.

FIG. 2 is a state diagram of the system bus 106. Each bus transaction consists of five cycles: arbitration, resolution, address, flow control/decode, and acknowledge, labeled 202, 204, 206, 208 and 210, respectively. When the bus is idle, it drops into a two-cycle mode, as shown by arrow 212. This allows new requests to appear on an idle bus as soon as they are ready, instead of waiting for the arbitration cycle to arrive.

Arbitration for the address and data buses 108 and 110 is done during arbitration cycle (I) 202. Arbitration for these buses is resolved during resolution cycle (II) 204.

During address cycle (III) 206, a data resource identification number (DRSC), which identifies the read resource, is transmitted via the command bus 112. Along with the DRSC, an associated address is transmitted on address bus 108.

During the flow control/decode cycle (IV) 208 no signals are driven on the address bus 108. Each node, including those not shown and shared memory node 118, decides how to respond to the most recent transaction. If the transaction is a read, write, update or invalidate, but the node has insufficient storage capacity to buffer the transaction, the node will drive a not_acknowledge (NACK) signal. In cycle IV, the 40 bit address bus and 8 bit command bus are concatenated, to function as 3 16-bit wide buses. The upper 16 lines are used by the nodes as an address NACK lines. The middle 16 lines are used by the nodes as data NACK lines. The lower 16 lines are used by the nodes to specify whether a read response is shared or not.

During the data acknowledge cycle (V) 210 nodes respond to the most recent data bus transaction. The upper third of the concatenated address and command buses are used by the nodes to acknowledge address cycles (A_Ack). If the bit corresponding to a node is active during the acknowledge cycle 210, this indicates that the node is rejecting the previous address cycle due to a full input buffer, or the like. Similarly, the middle third of the concatenated address and command buses are used by the nodes to acknowledge data bus cycles (D_Ack). The lower third of the concatenated address and command buses are used by the nodes to indicate cache state, if necessary.

Piggyback Reads in a System Implementation

Piggyback reads eliminate redundant read requests and responses by permitting node processors to share read requests and responses. In this implementation, piggyback reads are only performed by processor nodes. Piggyback reads are important for processor node performance, particularly when used with parallelizing compilers, such as the PFA, which is a parallelizing FORTRAN compiler developed by Silicon Graphics, Inc., Mountain View, Calif.

A parallelizing compiler frequently encounters points of synchronization while generating code. When a synchronization point has been reached, all participating processor nodes will be in step with each other. The piggyback read according to the present invention allows processor nodes which have just passed through a synchronization point, to share read requests and read responses, thus reducing bus utilization and decreasing read latency. Bus utilization is decreased because all processor nodes participating in a piggyback read can accept data from a single read response. Sharing of a single read request and response reduces the total number of read requests and responses placed on the bus 108. Latency is reduced because all processors can restart in parallel after a synchronization point, as opposed to waiting for a serial stream of read requests to complete before continuing.

Control logic necessary to implement piggyback reads resides within the bus interface logic 116. The implementation of piggyback reads also depends on data provided by the read resources described above. While it is not necessary to implement read resources in order to implement piggyback reads, there must exist some logic for tracking of pending request(s), which in this case is provided by the read resources themselves.

When a processor node issues a read request, the bus interface logic 116 will decide whether to attempt a piggyback read or issue the read as a standard bus request. A processor node which issues an exclusive read is requesting the data in an exclusive state, and will therefore never attempt a piggyback read (piggyback reads necessarily return data as shared). A processor node which issues a shared read can attempt a piggyback read if there is currently a read pending to the same cache line address (e.g., by checking the contents of CAM 114). If the matching pending read is also shared, the bus interface logic 116 will wait silently for a read response for the pending read to appear. At this time, the bus interface logic 116 will accept the read response to the matching read while signaling a shared state on the bus 108. This completes both the pending read and any additional reads which piggybacked on the read response.

Figure 3:
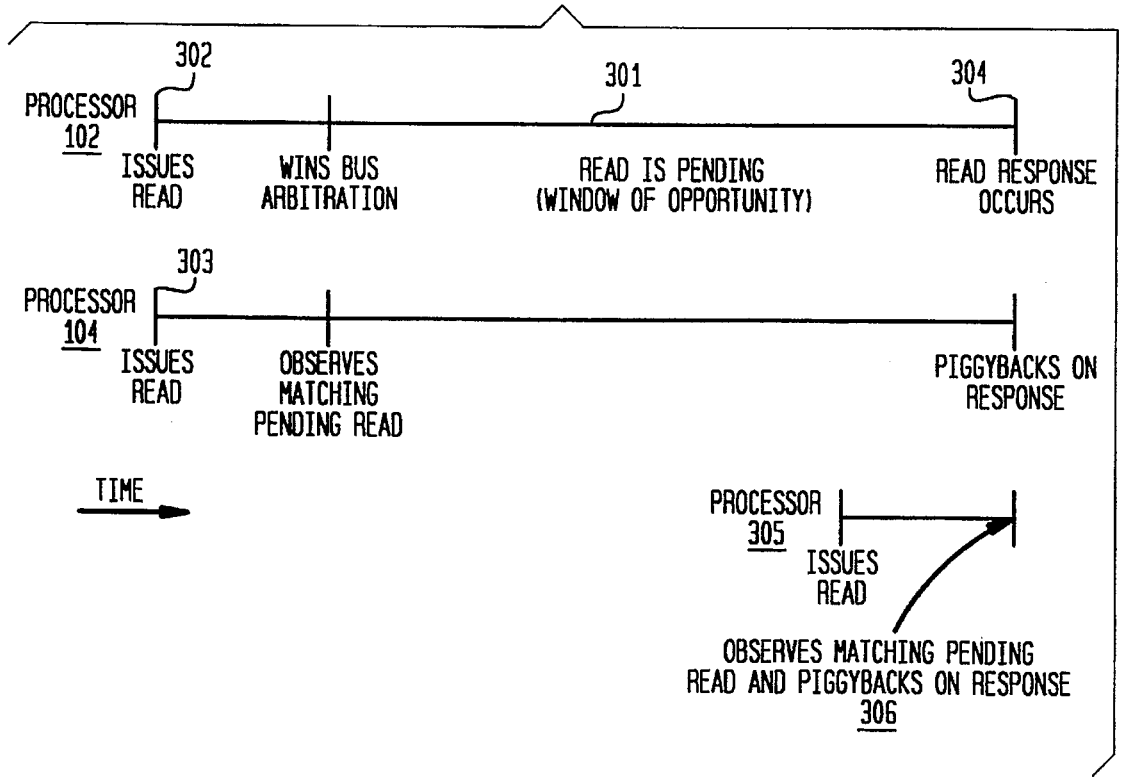
FIG. 3 shows a read response piggyback window of opportunity.

FIG. 3 shows how a read can be piggybacked whether it is nearly simultaneously with the pending read, if it occurs just before the read response, or if it occurs anywhere in between. According to the present invention, a window of opportunity 301 for a processor node participating in a piggyback read is maximized. In this example, processor nodes 102 and 104 both issue a read at time 302. Once the matching read 303 has been issued on the bus, it is pending until the read response arrives, as shown at time 304.

Additional processor nodes, such as a processor 305, may issue new reads and participate in the piggyback response from the time the matching read appears, until ,the read response actually occurs on the bus, as shown at 306. Because this implementation allows split transaction reads to be pending for variable read latency, the piggyback read response is particularly effective as it takes advantage of a larger window of opportunity (301).

It is important to note that there is no limit on the number of processors which can piggyback on a read response. FIG. 3 above shows processor nodes 102 and 104 piggybacking, and a third processor 305 observing a single bus transaction. However, all of the processor nodes in the system can participate.

It is also important to note that the system supports piggybacking of multiple simultaneous read responses to different addresses. According to the preferred embodiment, the total number of simultaneous read responses to be piggybacked is equal to the number of read resources supported. For example, a first group of nodes may be waiting to piggyback a first read response at the same time a second group of nodes is waiting to piggyback a second read response. In this example, the two groups may comprise one or more of the same nodes. Thus, at any instant in time, a single node can be waiting to piggyback a plurality of read responses.

Piggyback Read on a Memory Response

Figure 4:
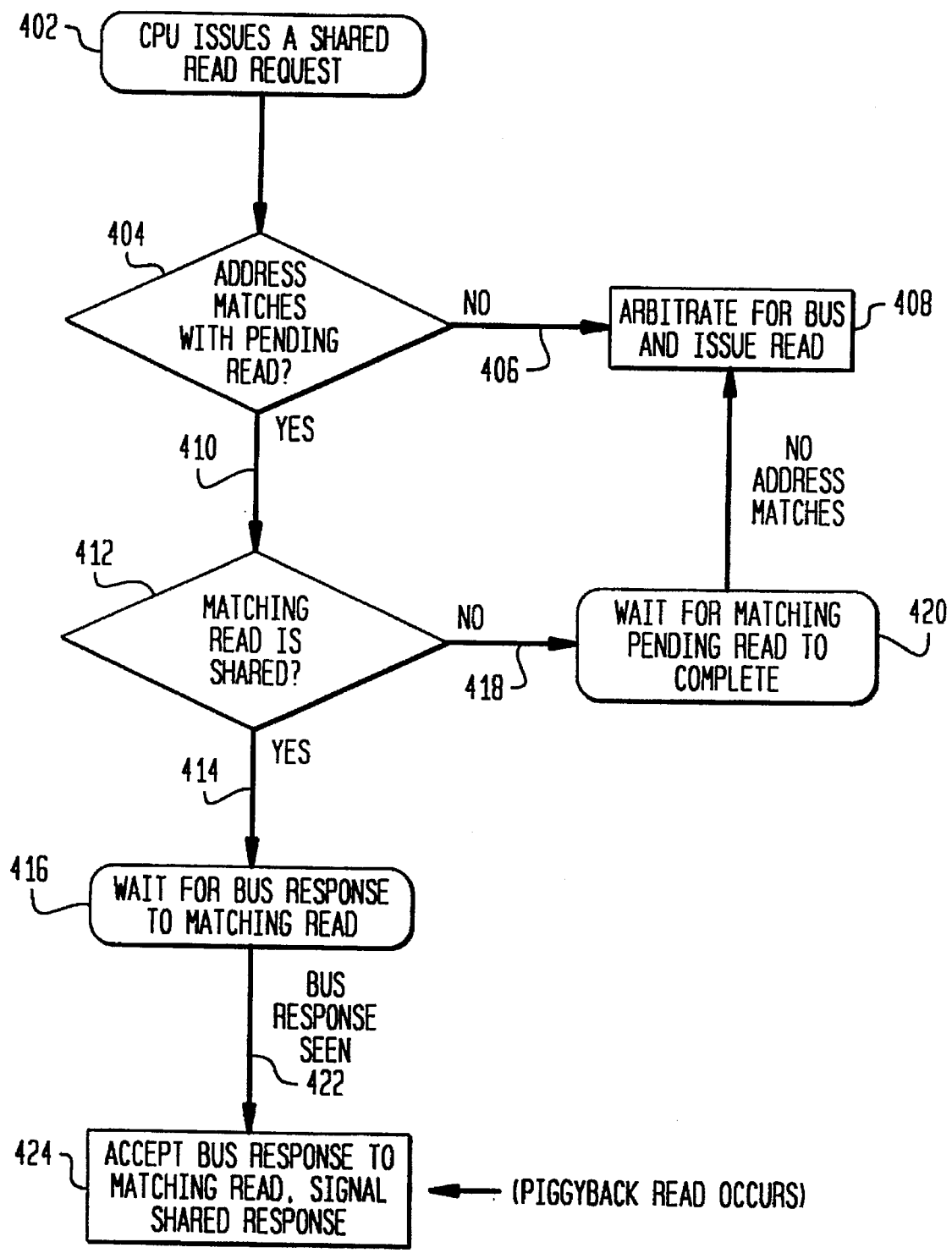
FIG. 4 shows a flowchart depicting read response piggybacking.

A further example will be described with reference to a flow chart in FIG. 4. This further example demonstrates how a read becomes pending and how it is completed, highlighting events significant to piggyback reads. First, a processor node issues a read, as shown at a step 402. The bus interface logic 116 will then check for matching pending reads, as shown at a step 404. If no matches are found, as shown at an arrow 406, the bus interface logic 116 will issue a new read, as shown at a step 408. To issue the read, the bus interface logic 116 arbitrates for the address bus, which is also shown at a step 408. Once the bus is granted, the bus interface logic 116 will place the read request and address on the bus. As long as this read is not NACK'ed during cycle V by an A__Ack (see 508 FIG. 5 below), the read request has been successfully placed in the bus and is considered pending.

While this read request is pending, one or more other processor nodes may also issue reads to the same address. In such a case, however, if the corresponding bus interface logic of the other processor nodes detect a match with the pending read, as shown by an arrow 410, these processor nodes will not arbitrate for the bus. In a step 412, these other processor nodes will determine whether the matching read is shared. If so, as shown by an arrow 414, they silently observe the bus traffic, awaiting a read response to the pending read which matches their own reads, as shown at a step 416. If the matching read is not shared, as shown by an arrow 418, the other processor nodes will wait for the matching read to complete, as shown at a step 420, and will finally proceed to arbitrate and issue a new read, as shown in step 408.

At a later time, a node (e.g., processor node, memory node, or the like) will provide a read response to the pending read, as shown generally at 422. It is assumed the responding node is a memory node, although it could also be a processor or an I/O node. The responding memory node will arbitrate for the data bus, and when the data bus is granted the memory node will drive the response data along with the read resource tag which was allocated when the read was first issued. At this time, other processor nodes with read requests which match the pending read will see the response and accept the response data as their own, as shown at a step 424. The only traffic generated by these piggybacking processors is that they drive the data shared line during cycle V of the response. The read is now complete and all participating processor nodes have been satisfied with a response.

FIG. 5 shows a bus timing diagram for an initial read request. A processor node first decides that a new cache block must be read into its cache. After arbitrating and winning access to the address bus (A__Arb), as shown at 502 during cycle I, the processor node issues a read request 504 and places the address of the required block on the address lines of the bus, as shown at 506. If the read request is acknowledged by all other nodes and no other errors occur, the read request is considered pending. If a not__acknowledge signal was driven an A__Ack would appear during cycle V, as shown at 508. In the absence of a not__acknowledge signal, the processor node which placed the read request on the bus will simply wait until the request is satisfied by a read response.

FIG. 6 shows a bus timing diagram of a read response that is piggybacked by one or more additional processor nodes. Once the read request is pending, it is possible for one or more additional processor nodes to decide that they also require the cache block that was requested by the first node. As described above, instead of arbitrating for the address bus, a additional processor nodes requiring the same cache block will silently wait for the read response to the requesting processor node's read request. The read response to the requesting node's read request is shown to appear on the bus at 602 (which precedes a responding node's arbitration for the data bus (D_Arb) shown at 604). Finally, the additional processor nodes waiting for the response will load the data into their caches, or the like, as shown at 606.

While various embodiments of the present invention have been described above, it should be understood that they have been presented by way of example, and not limitation. It will be apparent to persons skilled in the relevant art that various changes in form and detail may be made therein without departing from the spirit and scope of the invention. The present invention should not be limited by any of the above-described exemplary embodiments, but should be defined only in accordance with the following claims and their equivalents. All cited patent documents and publications in the above description are incorporated herein by reference.

What is claimed is:

1. A system for implementing piggybacking read responses, comprising:

a shared main system bus; and a plurality of processor nodes coupled to said shared main system bus; wherein each of said processor nodes includes:

determining means for determining whether a pending read request, which is transmitted on said shared main system bus by a first processor node of said plurality of processor nodes, addresses the same data stored in a memory as required by a subsequent read request from a second processor node of said plurality of processor nodes; and piggybacking means for piggybacking a read response corresponding to said pending read request, wherein when said read response is transmitted on said shared main system bus with said same data, and said second processor node identifies said read response and accepts said same data from said shared main system bus without transmitting said subsequent read request on said shared main system bus or otherwise generating any additional bus traffic.

2. The system according to claim 1, wherein said first processor node and said second processor node are the same processor node.

3. The system according to claim 1, wherein said first processor node and said second processor node are two different processor nodes.

4. The system according to claim 1, wherein said memory is resident on a memory node and said memory node is responsive to said pending read request and said second processor node is an input/output node.

5. The system according to claim 1, further comprising memory node piggybacking means for permitting a memory node, coupled to said shared main system bus, to piggyback said read response corresponding to said pending read request, thereby permitting said memory node, in addition to said second processor node, to identify and accept said same data from said shared main system bus, without transmitting a further read request from said memory node on said shared main system bus or otherwise generating any additional bus traffic.

6. The system according to claim 1, wherein said determining means compares an address associated with said subsequent read request with an address associated with said pending read request.

7. The system according to claim 1, wherein the system includes assigning means for assigning and storing read resources to track said read response and protect said pending read request by preventing the transmission of additional read requests which address said same data of said pending read request.

8. The system according to claim 7, wherein said read resources are managed by using read resource numbers, where a given one of said processor nodes issuing said read response transmits a read resource number on said shared main system bus rather than transmitting an address of said same data and said pending read request, thereby conserving bus bandwidth.

9. The system according to claim 8, wherein each of said nodes includes storage means for storing a tag for said pending read request according to said read resource number.

10. The system according to claim 9, wherein said tag is said address of said data and said pending read request.

11. A method for piggybacking read response on a shared main system bus having a plurality of processor nodes coupled thereto comprising the steps of:

determining whether a pending read request from a first processor node addresses the same data stored in a memory as required by a subsequent read request from a second processor node; and piggybacking a read response corresponding to said pending read request, wherein said read response includes said same data, and said second processor node identifies said read response and accepts said same data without transmitting said subsequent read request on said shared main system bus or otherwise generating any additional bus traffic;

wherein said determining and said piggybacking steps are performed by the processor nodes.

12. The method according to claim 11, wherein said first processor node and said second processor node are the same node.

13. The method according to claim 11, wherein said first processor node and said second processor node are two different nodes.

14. The method according to claim 11, wherein said memory is resident on a memory node and said memory node is responsive to said pending read request.

15. The method according to claim 11, further comprising the step of permitting a memory node, coupled to said shared main system bus, to piggyback said read response corresponding to said pending read request, thereby permitting said memory node, in addition to said second processor node, to identify and accept said same data from said shared main system bus, without transmitting a further read request from said memory node on said shared main system bus or otherwise generating any additional bus traffic.

16. The method according to claim 11, wherein said determining step comprises the step of comparing an address associated with said subsequent read request with an address associated with said pending read request.

17. The method according to claim 11, further comprising the step of assigning and storing read resources to track said read response and protect said pending read request by preventing the transmission of additional read requests which address said same data of said pending read request.

18. The method according to claim 17, further comprising the step of assigning a read resource number to said read resources, where a given one of said processor nodes issuing said read response transmits said read resource number on said shared main system bus rather than transmitting an address of said same data and said pending request, thereby conserving bus bandwidth.

19. The method according to claim 18, further comprising the step of storing a tag for each pending read request according said read resource number.

20. The method according to claim 19, wherein said tag is said address of said same data and said pending read request.

* * * * *